Nov. 10, 1970  L. SCHWAB  3,538,686
SELF-SEALING AND SELF-HOLDING FILTER FRAME
Filed Oct. 21, 1968
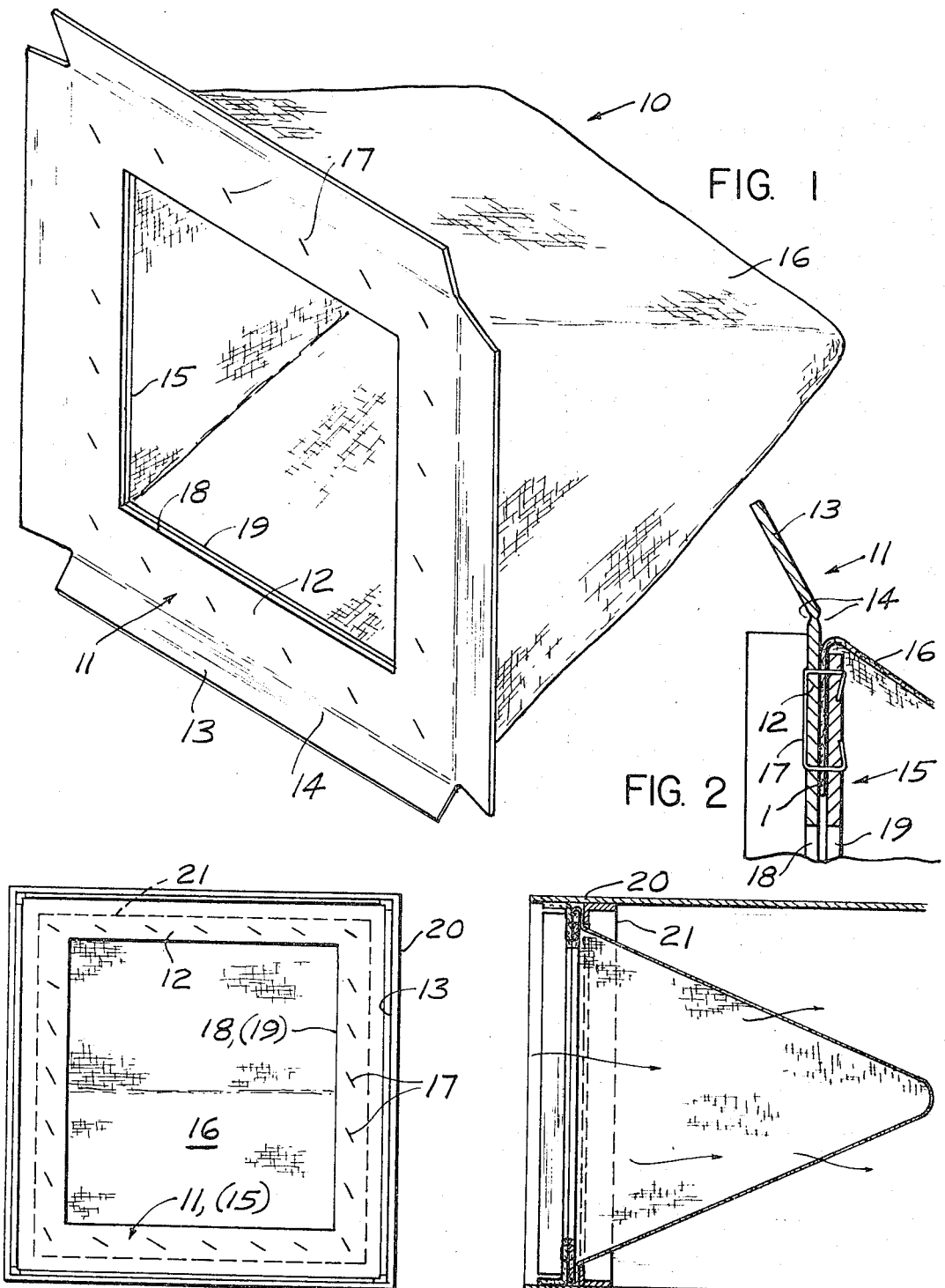
INVENTOR.
LOUIS SCHWAB
BY Hane and Baxley
ATTORNEYS United States Patent Office 3,538,686
Patented Nov. 10, 1970

3,538,686
SELF-SEALING AND SELF-HOLDING
FILTER FRAME
Louis Schwab, P.O. Box 905,
Fern Park, Fla. 32730
Filed Oct. 21, 1968, Ser. No. 769,031
Int. Cl. B01d 46/02
U.S. Cl. 55—377   5 Claims

ABSTRACT OF THE DISCLOSURE

A filter assembly for filtering out dust or other discrete particles entrained in a gaseous flow such as an air flow the frame of which has laterally protruding flaps which are elastically joined to the frame proper and engageable with the surrounding boundary walls of a holding frame or duct with a frictional pressure fit thereby releasably holding the filter assembly in its operational position or compensating for tolerances in the size of the holding frame or duct.

SPECIFICATION

The present invention relates to a filter assembly for filtering out dust and other discrete particles entrained in a gaseous flow such as a dust laden air flow, and more particularly to a frame structure for such filter assembly.

BACKGROUND

Filter assemblies of the general kind above referred to comprise a substantially rigid frame usually of generally rectangular outline to which is suitably secured the open and end of a bag-shaped, for instance, conical filter. The filter bag may have one layer or two spaced apart layers of a pliable filter medium such as Dynel industrial cloth, nylon cloth or reinforced cotton fabric. If desired, the filter material can be flame proofed by techniques suitable and known for the purpose. The density of the filter medium is selected in accordance with the particular conditions of the gaseous flow to be liberated from discrete particles and the acceptable pressure drop between the upstream side and the downstream side of the filter medium. The dust or other discrete particles are trapped by the filter medium as air or another gaseous flow passes through the same. The filter assemblies are mounted in a holding frame or directly in a duct, either singly or in a coplanar array.

When in operation the filter assemblies must be more or less frequently detached for replacement or cleaning, depending upon the severity of the pollution of the flow to be filtered. As evident it is desirable that replacement or cleaning of filter assemblies can be conveniently and rapidly effected and without requiring skilled labor. It is also desirable that the disposal of an exhausted filter assembly is economically feasible without sacrifice of efficiency.

THE INVENTION

It is a broad object of the invention to provide a novel and improved filter assembly of the general kind above referred to the frame of which can be slid into and out of its operational position without requiring tightening or loosening of fastening means and also without requiring skilled labor.

A more specific object of the invention is to provide a novel and improved filter assembly of the general kind above referred to the frame of which retains itself in its operational position by frictionally gripping the adjacent walls of a holding frame or duct and which can be detached by simply pulling the frame out of said position.

Another more specific object of the invention is to provide a novel and improved filter assembly of the general kind above referred to which can be so inexpensively manufactured that disposal of the entire assembly instead of cleaning the filter medium and reinstalling the assembly, is economically practical.

The afore-pointed out objects, features and advantages and other objects, features and advantages which will be pointed out hereinafter, are obtained by providing in superimposition and secured to each other a base frame supporting the filter medium and a face frame having along its peripheral outline flaps elastically joined thereto, preferably by elastic life hinges. The peripheral outline of the opening of the holding frame or the duct in which the filter assembly is to be installed and the outer peripheral outline of the face frame including its flaps are so correlated that the flaps engage the adjacent walls of the holding frame or the duct with a frictional pressure grip thereby releasably retaining the filter assembly in position and permitting detachment thereof by simply pulling it out.

In the accompanying drawing a preferred embodiment of the invention is shown by way of illustration and not by way of limitation.

In the drawing:

FIG. 1 is a perspective view of a filter assembly according to the invention,

FIG. 2 is a fragmentary sectional view of the frame structure of the assembly,

FIG. 3 is a front view of FIG. 1; and

FIG. 4 is a sectional view of the filter assembly installed in a duct.

Referring now to the figures in detail, the exemplified filter assembly 10 comprises a face frame 11. The frame is made of a suitable inexpensive material of sufficient rigidity such as a stiff cardboard. It has a generally rectangular outer peripheral outline and also a generally rectangular inlet opening 18.

The face frame has a flat frame portion 12 from which extend, preferably at all four sides, flaps 13 elastically joined to frame portion 12 by a fold line 14. While frame portions 12 and flaps 13 may be separate components joined to each other by elastic hinges, it is preferable to make the face frame of one piece and to provide as hinge an elastic strip between the flaps 13 and frame portion 12 as is indicated in FIG. 2 at 14. Hinges of this kind are well known as "life hinges" in the art and widely used for many purposes.

The filter assembly further comprises a main or base frame 15 also made of a suitable sufficient rigid and inexpensive material and having an entry opening 19. The dimensions of the two frames should, of course, match each other.

A filter bag 16 of conventional design made of conventional material as previously described (the configuration and structure of the filter bag do not constitute part of the invention) is secured to base frame 15 by turning the rim of the filter bag over base frame 15 as is best shown in FIG. 2. The face frame and the base frame are then secured to each other in superimposition with the turned-over portions of filter 16 sandwiched therebetween as best shown in FIG. 2, by suitable means such as staples 17 penetrating through both frames and also the filter.

The filter assembly can be installed in a holding frame of conventional design or in a duct 20 as is shown in FIG. 2. To facilitate installation of the assembly and to retain the same safely in a selected position within the duct an angle support 21 is secured within the duct. The filter assembly is installed by simply pushing it into the duct so that it rests against support 21 which constitutes a shoulder for base frame 15 as is clearly shown in FIG. 4. The flaps will automatically press themselves against the adjacent wall portions of the duct thereby retaining the filter assembly in position with a frictional pressure grip. Removal of the assembly can be effected by simply pulling the assembly out of the duct against the frictional retentive force of flaps 13. As is evident, the flaps also automatically compensate for oversized holding frames or ducts. In actual practice, for example, holding frames may vary as much as ½ inch in height and/or width.

As is evident, an array of filter assemblies according to the invention can be similarly installed in multiple holding frames as they are well known in the art.

What is claimed is:

1. A filter assembly for filtering out dust or other discrete particles entrained in a gaseous flow, said filter assembly comprising in combination:
    a substantially rigid base frame defining a filter opening;
    a filter bag made of a pliable air pervious filter medium and having an open end substantially coextensive with the peripheral outline of said filter opening, the peripheral marginal portion of said filter medium overlying said base frame on one side thereof to provide access into the bag through said filter opening;
    a substantially rigid face frame defining a filter opening having substantially the same shape and size as the filter opening defined by the base frame, said face frame being superimposed upon said one side of the base frame with said filter openings in substantial registry, thereby sandwiching said marginal filter medium portion between the two frames;
    fastening means extending through the two frames and the filter medium therebetween;
    retaining means including substantially rigid flaps elastically hinged at one end to the other peripheral edge of one frame, said flaps protruding laterally beyond the outer peripheral edge of the other frame whereby the flaps engage boundary walls of a duct or a holding frame with a frictional grip upon insertion of the filter assembly thereinto.

2. The filter assembly according to claim 1 wherein said frames define rectangular filter openings, and wherein said filter bag has at its open end a rectangular opening of substantially the same peripheral outline as said filter openings.

3. The filter assembly according to claim 1 wherein said flaps are on the face frame and protrude beyond the outer peripheral edge of the base frame.

4. The filter assembly according to claim 3 wherein said face frame has a rectangular outer peripheral outline, and wherein said face frame and said flaps are a one-piece structure, said flaps being elastically hinged to the face frame by hinges in the form of score lines along the outer peripheral outline of said face frame.

5. The filter assembly according to claim 1 wherein said frames have substantially rectangular outer peripheral outlines and are of equal geometrical shape, said marginal portions of the filter medium overlying said base frame from the outer peripheral outline thereof, and wherein the area as defined by the outer peripheral outline of the base frame is smaller than the area as defined by the outer peripheral outline of the face frame.

References Cited
UNITED STATES PATENTS

| | | | |
|---|---|---|---|
| 2,418,371 | 4/1947 | Smellie | 55—382 |
| 2,596,806 | 5/1952 | Borkoski | 55—367 |
| 2,732,029 | 1/1956 | Hoffmann | 55—377 |
| 2,752,002 | 6/1956 | Wied | 55—376 |
| 2,964,127 | 12/1960 | Korn | 55—509 X |
| 2,976,796 | 3/1961 | Anthony et al. | 55—507 X |
| 2,995,206 | 8/1961 | Smithson | 55—376 |
| 3,023,839 | 3/1962 | Best | 55—524 X |
| 3,252,274 | 5/1966 | Benson et al. | 55—380 X |
| 3,309,848 | 3/1967 | Schwab | 55—380 X |

DENNIS E. TALBERT, JR., Primary Examiner

U.S. Cl. X.R.

55—378, 381, 491, 509, 529; 248—95